(12) United States Patent
Chu

(10) Patent No.: US 9,498,894 B2
(45) Date of Patent: Nov. 22, 2016

(54) CUTTING DEVICE

(71) Applicant: HON HAI PRECISION INDUSTRY CO., LTD., New Taipei (TW)

(72) Inventor: Chih-Hao Chu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 374 days.

(21) Appl. No.: 14/139,784

(22) Filed: Dec. 23, 2013

(65) Prior Publication Data

US 2014/0182439 A1 Jul. 3, 2014

(30) Foreign Application Priority Data

Dec. 27, 2012 (TW) .............................. 101150575 A

(51) Int. Cl.
*B26D 5/12* (2006.01)
*B29C 45/38* (2006.01)
*B26F 1/44* (2006.01)

(52) U.S. Cl.
CPC . *B26D 5/12* (2013.01); *B26F 1/44* (2013.01); *B29C 45/382* (2013.01); *B26F 2210/06* (2013.01); *Y10T 83/8858* (2015.04)

(58) Field of Classification Search
CPC ........... Y10T 83/8858; Y10T 83/8864; Y10T 83/541; Y10T 83/544; Y10T 83/8735; Y10T 83/8748; B26D 5/12; B26F 2210/06; Y10S 83/914; B29C 45/38; B29C 45/382; B29C 2045/384; B29C 37/02

USPC .............................................. 83/639.1, 639.5
See application file for complete search history.

(56) References Cited

U.S. PATENT DOCUMENTS

| | | | | |
|---|---|---|---|---|
| 3,935,811 A | * | 2/1976 | Lenz ...................... | B21D 37/14 100/229 R |
| 5,253,559 A | * | 10/1993 | Philippe ................. | H05K 3/005 83/133 |
| 5,322,202 A | * | 6/1994 | Pelletier ................... | B26D 5/12 225/104 |
| 2002/0112578 A1 | * | 8/2002 | Duggins ............. | B21D 28/002 83/13 |
| 2005/0000331 A1 | * | 1/2005 | Farrell .................... | B26D 7/24 83/13 |
| 2012/0103159 A1 | * | 5/2012 | Lin .......................... | B26D 5/12 83/620 |

* cited by examiner

*Primary Examiner* — Stephen Choi
*Assistant Examiner* — Evan MacFarlane
(74) *Attorney, Agent, or Firm* — Zhigang Ma

(57) ABSTRACT

A cutting device includes a bottom plate, a platform located on the bottom plate for holding a workpiece, a first support plate connected to the support plate and located above the bottom plate, a first telescopic cylinder having a first piston, a blade connected to the first piston, a first medium providing device configured to provide medium, a first switch including a gateway A1 connected to a first lower cavity of the first telescopic cylinder, a gateway B1 opened to the outside, a gateway P1 connected to the first medium providing device, a first sensor including a gateway A2 opened to the outside, a gateway B2 communicating with a first upper cavity of the first telescopic cylinder, and a gateway P2 connected to the gateway B1.

2 Claims, 3 Drawing Sheets

CUTTING DEVICE

BACKGROUND

1. Technical Field

The present disclosure relates to cutting devices, and particularly to a cutting device for cutting off melt-delivery channels from injection-molded lenses.

2. Description of Related Art

Injection molding is a manufacturing process for producing parts (e.g., lenses) by injecting molten material into a molding cavity of a mold. After a product is molded, melt-delivery channels (e.g., sprues and runners) must be removed. Although conventional cutting devices satisfy basic requirements, a new type of cutting device for cutting off the melt-delivery channels is still required.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Embodiments of the present disclosure are now described in detail, with reference to the accompanying drawings.

Figure 1:
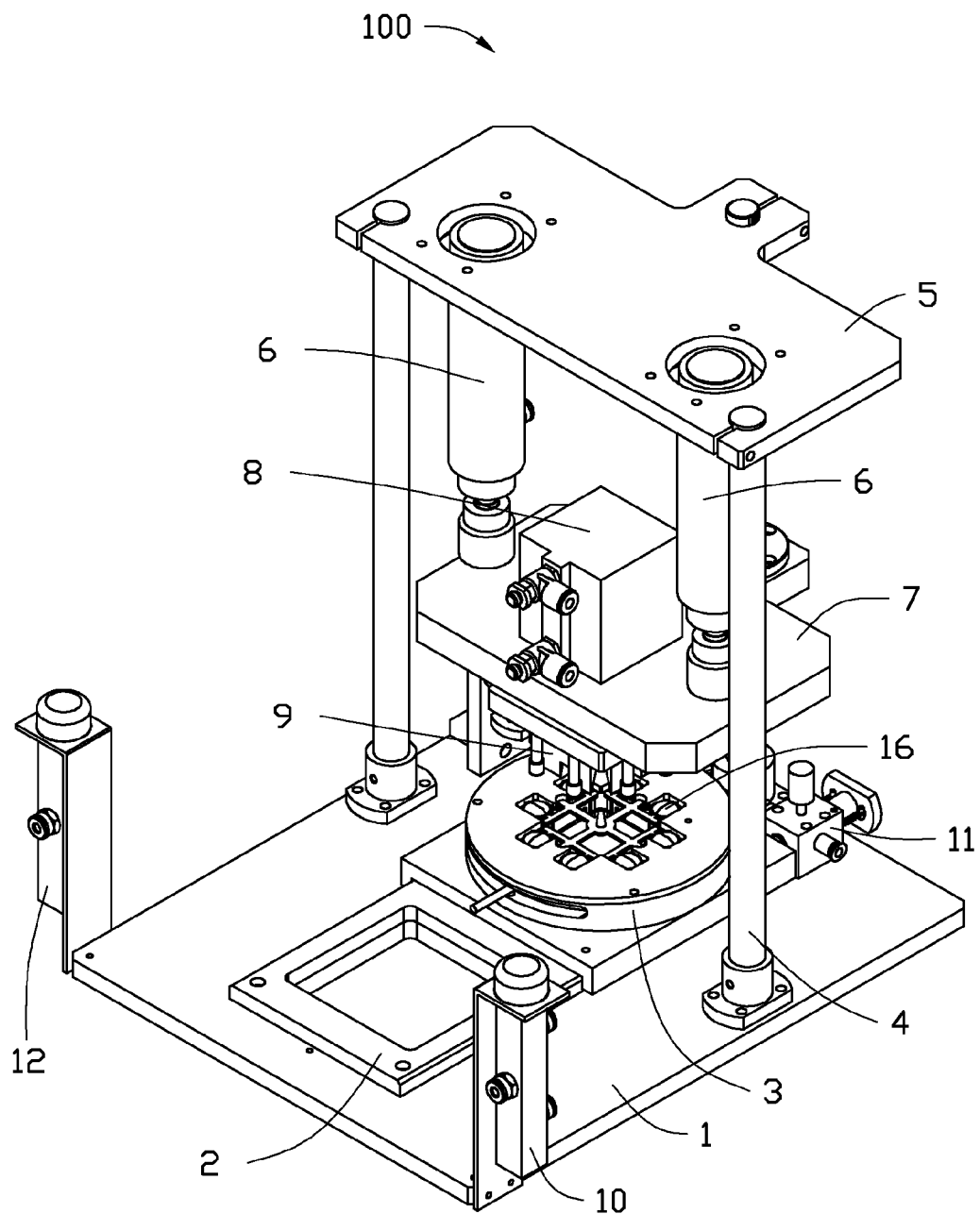
FIG. 1 is an isometric view of an embodiment of a cutting device.
Figure 2:
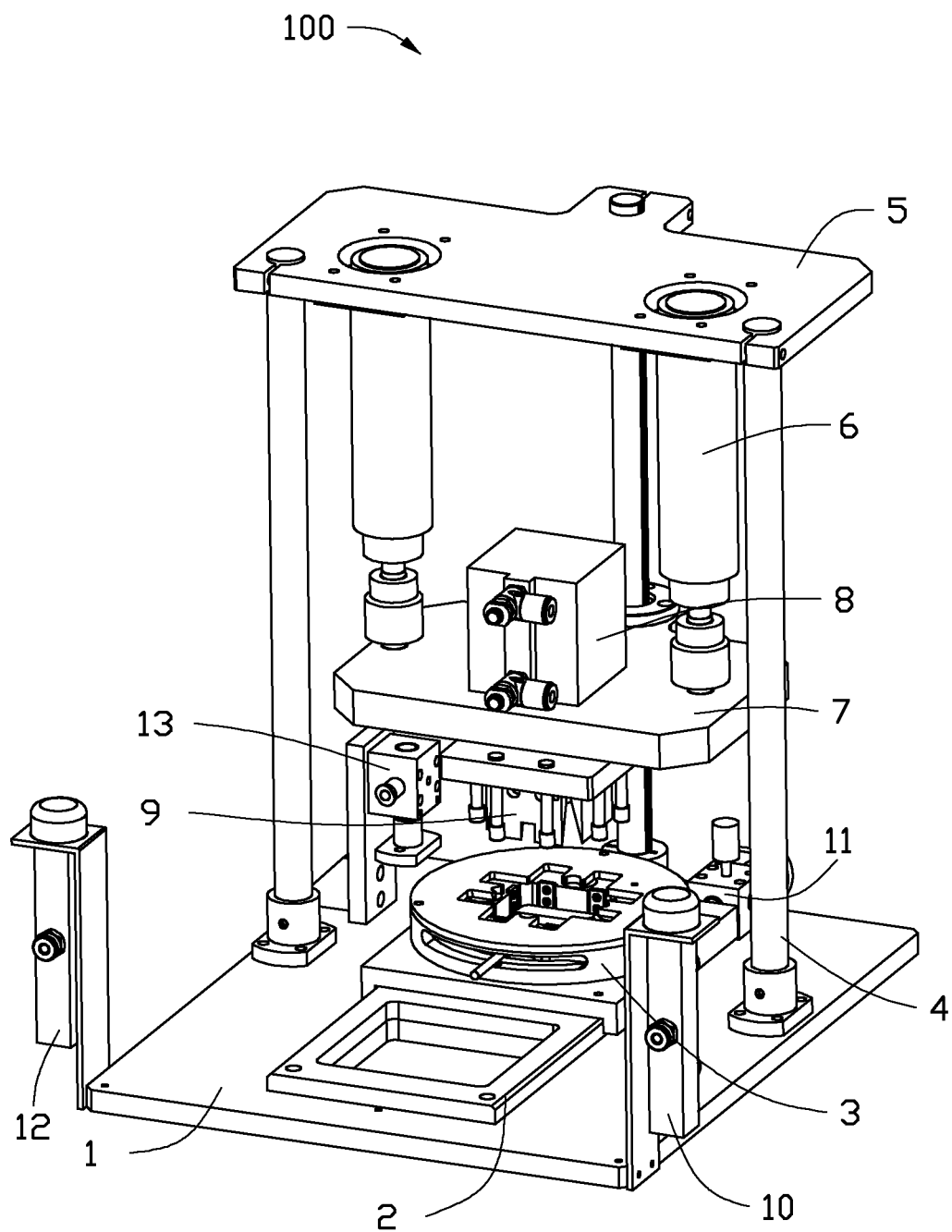
FIG. 2 is similar to FIG. 1, but viewed from a different perspective.
Figure 3:
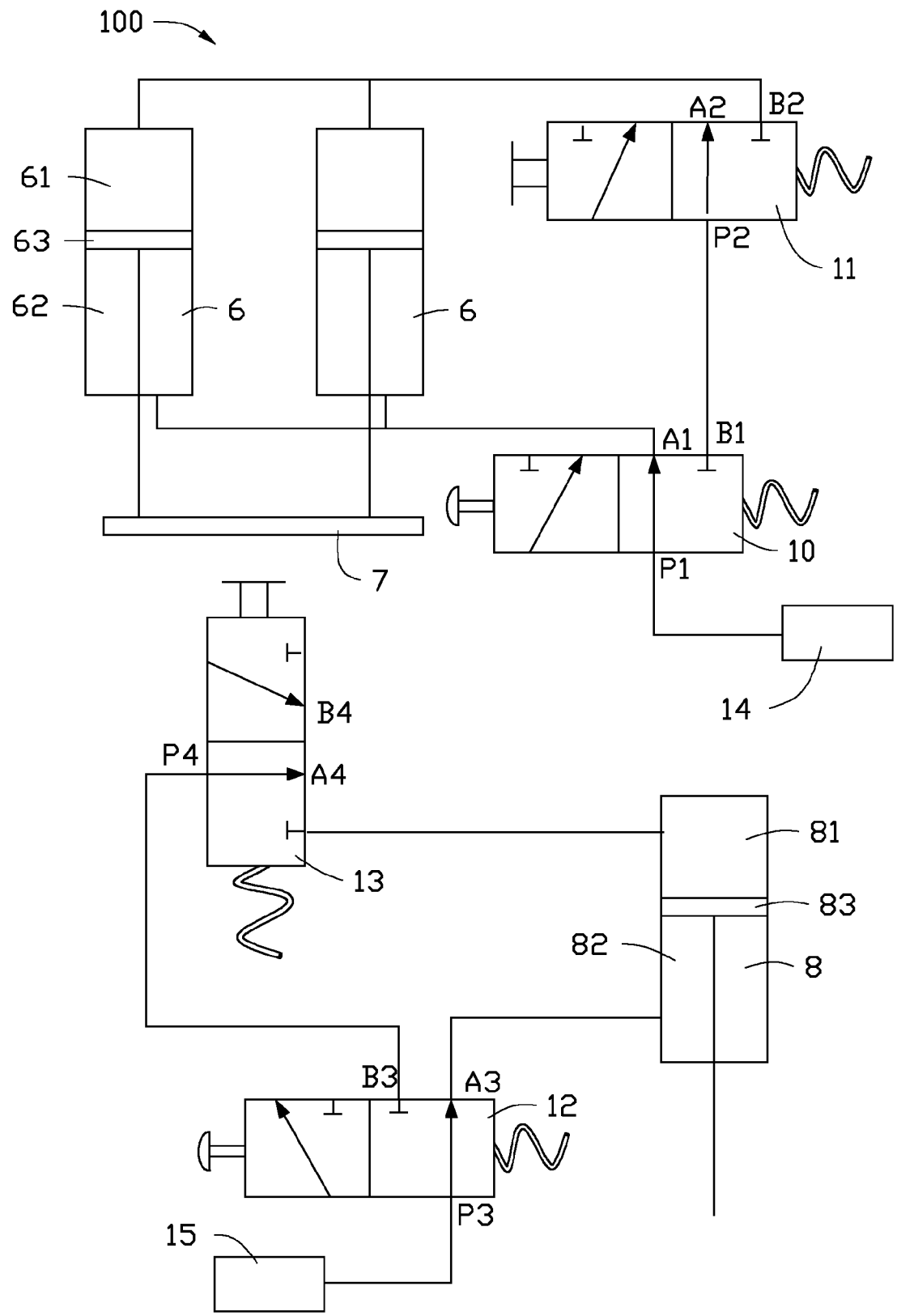
FIG. 3 is a schematic diagram showing control elements and actuating elements of the cutting device of FIG. 1.

Referring to FIGS. 1-3, a cutting device 100 includes a bottom plate 1, a sliding rail 2, a platform 3 slidable along the sliding rail 2, and three positioning rods 4 connected to the bottom plate 1. The platform 3 holds a workpiece 16 in position for cutting. The cutting device 100 further includes a first support plate 5 connected to top ends of the positioning rods 4, two first telescopic cylinders 6, and a second support plate 7. The cutting device 100 is used to cut the workpiece 16.

First ends of the first telescopic cylinders 6 are connected to the first support plate 5. The first telescopic cylinders 6 each define a first upper cavity 61, a first lower cavity 62 isolated from the first upper cavity 61, and a first piston 63 between the first upper cavity 61 and the first lower cavity 62. The second support plate 7 is connected to the first pistons 63 of the first telescopic cylinders 6.

The cutting device 100 further includes a second telescopic cylinder 8, a blade 9, a first switch 10, a first sensor 11, a second switch 12, a second sensor 13, a first medium providing device 14, and a second medium providing device 15. The second telescopic cylinder 8 defines a second upper cavity 81, a second lower cavity 82 isolated from the second upper cavity 81, and a second piston 83 between the second upper cavity 81 and the second lower cavity 82.

In one embodiment, the first switch 10, the first sensor 11, the second switch 12, and the second sensor 13 are 3-way, 2-position valves. The first switch 10 includes three gateways A1, B1, and P1. In the illustrated embodiment, the gateways are pathways to allow a medium, such as gas or oil, to flow through. The first sensor 11 is mounted on the bottom plate 1 and located adjacent to one end of the sliding rail 2. The gateway A1 communicates with the lower cavities 62 of the first telescopic cylinders 6. The gateway B1 is connected to the first sensor 11. The gateway P1 is connected to the first medium providing device 14. When the first switch 10 is switched off, the gateway P1 communicates with the gateway A1, thereby causing the first piston 63 to move away from the second sensor 13. When the first switch 10 is switched on, the gateway P1 communicates with the gateway B1.

The first sensor 11 includes three gateways A2, B2, and P2. The gateway A2 is opened to the outside. The gateway B2 communicates with the upper cavities 61 of the first telescopic cylinders 6. The gateway P2 is connected to the gateway B1 of the first switch 10. When the first sensor 11 is in an original state, the gateway P2 communicates with the gateway A2. When the first sensor 11 is actuated by the abutting of the platform 3 and thus in an actuated state, the gateway P2 communicates with the gateway B2.

The second switch 12 includes three gateways A3, B3, and P3. The gateway A3 communicates with the second lower cavity 82 of the second telescopic cylinder 8. The gateway B3 is connected to the second sensor 13. The gateway P3 is connected to the second medium providing device 15. When the second switch 12 is switched on, the gateway P3 communicates with the gateway B3. When the second switch 12 is switched off, the gateway P3 communicates with the gateway A3.

The second sensor 13 includes three gateways A4, B4, and P4. The gateway A4 is opened to the outside. The gateway B4 communicates with the second upper cavity 81 of the second telescopic cylinder 8. The gateway P4 communicates with the gateway B3 of the second switch 12. When the second sensor 13 is in an original state, the gateway P4 communicates with the gateway A4. When the second sensor 13 is actuated by the abutting of the second support plate 7 and thus in an actuated state, the gateway P4 communicates with the gateway B4.

In use, the platform 3 is manually pulled away from the blade 9 for easily loading the workpiece 16. After the workpiece 16 has been placed on the platform 3, the platform 3 is moved back to the original position for loading the workpiece 16. Once the platform 3 abuts the first sensor 11, the first sensor 11 is actuated. After the first switch 10 is switched on, the medium provided by the first medium providing device 14 flows into the first upper cavity 61 of the first telescopic cylinder 6 via the gateways P1, B1, P2, and B2, thereby causing the first piston 63 to move downward and the second support plate 7 to actuate the second sensor 13. Then, the second switch 12 is manually switched on and the medium provided by the second medium providing device 15 flows into the second upper cavity 81 of the second telescopic cylinder 8, thereby driving the blade 9 to move downwards and cut off the melt-delivery channels of the workpiece 16 on the platform 3.

After that, the first switch 10 and the second switch 12 are switched off, and the medium provided by the first medium providing device 14 flows into the first lower cavity 62 of the first telescopic cylinder 6 via the gateways P1, A1, thereby causing the piston P of the first telescopic cylinder 6 to drive the second support plate 7 to move upwards. Then, the second sensor 13 is in the original state, and the medium provided by the second medium providing device 15 flows into the second lower cavity 82 of the second telescopic cylinder 8, thereby causing the blade 9 to return to an original position. Thus, a number of lenses formed by cutting the workpiece 16 can be obtained.

If the platform 3 is not in the proper position for actuating the first switch sensor 11, and when the first switch 10 and the second switch 12 are switched on, the medium provided by the first medium providing device 14 does not flow into the first upper cavity 61 of the first telescopic cylinder 6, so that the second support plate 7 does not move downward to actuate the second sensor 13. Thus, the medium provided by the second medium providing device 15 does not flow into the second upper cavity 81 of the second telescopic cylinder 8, and the blade 9 does move downward and accidentally injuring a user.

In another embodiment, the cutting device 100 can just include the first telescopic cylinder 6, the first switch 10, the first sensor 11, and the first medium providing device 14, such that the second support plate 7, the second telescopic cylinder 8, the second switch 12, the second sensor 13, and the second medium providing device 15 are omitted. The blade 9 can be directly connected to the first piston 63 of the first telescopic cylinder 6. When the platform 3 is moved to actuate the first sensor 11, the first switch 10 is switched on, and the blade 9 moves downward to cut off the melt-delivery channels of the workpiece 16.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A cutting device for cutting off melt-delivery channels from a workpiece, the cutting device comprising:
    a bottom plate;
    a platform located on the bottom plate for holding the workpiece in position;
    a first support plate connected to the bottom plate by at least one positioning rod and located above the bottom plate;
    at least one first telescopic cylinder extending from the first support plate toward the bottom plate and defining a first upper cavity, a first lower cavity isolated from the first upper cavity and comprising a first piston between the first upper cavity and the first lower cavity;
    a second support plate connected to the first piston and configured to be moved by the first piston toward or away from the bottom plate;
    a first medium providing device configured to provide a medium for moving the first piston;
    a first switch comprising a gateway (A1) communicating with the first lower cavity of the at least first telescopic cylinder, a gateway (B1) opening to outside of the first switch, and a gateway (P1) connected to the first medium providing device, wherein when the first switch is in an original state, the gateway (P1) communicates with the gateway (A1), and when the first switch is manually switched on, the gateway (P1) communicates with the gateway (B1);
    a first sensor comprising a gateway (A2) opening to outside of the first sensor, a gateway (B2) communicating with the first upper cavity of the at least one first telescopic cylinder, and a gateway (P2) communicating with the gateway (B1) of the first switch, wherein when the first sensor is actuated by the abutting of the platform, the gateway (P2) communicates with the gateway (B2), and when the first sensor is in an original position, the gateway (P2) communicates with the gateway (A2);
    a second telescopic cylinder comprising a second upper cavity, a second lower cavity isolated from the second upper cavity, and a second piston between the second upper cavity and the second lower cavity;
    a second medium providing device configured to provide a medium for moving the second piston;
    a blade connected to the second piston and configured to be moved by the second piston toward or away from the workpiece;
    a second switch comprising a gateway (A3) communicating with the second lower cavity, a gateway (B3) opening to outside of the second switch, and a gateway (P3) connected to the second medium providing device, wherein when the first switch is switched on, the gateway (P3) communicates with the gateway (A3), and when the first switch is switched off, the gateway P3 communicates with the gateway (B3);
    a second sensor configured to be abutted by the second support plate when the second support plate is moved by the first piston toward the bottom plate, the second sensor comprising a gateway (A4) opening to outside of the second sensor, a gateway (B4) connected to the second upper cavity of the second telescopic cylinder, and a gateway (P4) connected to the gateway (B3) of the second switch, wherein when the second sensor is in an original state, the gateway (P4) communicates with the gateway (A4), and when the second sensor is actuated by the abutting of the second support plate, the gateway (P4) communicates with the gateway (B4);
    wherein when the first sensor is actuated by the platform and the first switch is manually switched on, the medium provided by the first medium providing device enters the upper cavity of the first telescopic cylinder for driving the first piston to move the second support plate toward the bottom plate;
    wherein when the first switch is manually switched off, the medium provided by the first medium providing device enters the lower cavity of the first telescopic cylinder for driving the first piston to move the second support plate away from the bottom plate;
    wherein when the second sensor is actuated by the second support plate and the second switch is manually switched on, the medium provided by the second medium providing device enters the second upper cavity of the second telescopic cylinder for driving the second piston to move the blade toward the workpiece to cut off the melt-delivery channels from the workpiece; and
    wherein when the second switch is manually switched off, the medium provided by the second medium providing device enters the second lower cavity of the second telescopic cylinder for driving the second piston to move the blade away from the workpiece.

2. The cutting device as in claim 1, wherein the platform abuts against the first sensor by being slid along a sliding rail arranged on the bottom plate.

* * * * *